(12) United States Patent
Mathisen

(10) Patent No.: US 6,698,526 B1
(45) Date of Patent: Mar. 2, 2004

(54) WEED-GRIPPING PRY TOOL

(76) Inventor: Jon Aril Mathisen, 2316 Capitol Way S., Olympia, WA (US) 98501

( * ) Notice: Subject to any disclaimer, the term of this patent is extended or adjusted under 35 U.S.C. 154(b) by 0 days.

(21) Appl. No.: 10/245,544

(22) Filed: Sep. 16, 2002

(51) Int. Cl.[7] .............................. A01B 1/16; A01B 1/18
(52) U.S. Cl. .................................... 172/371; 7/114
(58) Field of Search ............................... 172/371, 381, 172/378; 16/110.1, 112.1; 7/114, 125; 254/23, 24; 294/59, 58, 53.5

(56) References Cited

U.S. PATENT DOCUMENTS

| | | | |
|---|---|---|---|
| 97,399 A | 11/1869 | Holmes | |
| 220,501 A | 10/1879 | Snapp | |
| 547,679 A | 10/1895 | Read | |
| 779,984 A * | 1/1905 | Allen | 254/132 |
| 1,007,656 A | 10/1911 | Fox | |
| 1,502,246 A | 7/1924 | Hagopian | |
| 1,751,481 A * | 3/1930 | Tourrette | 294/50.9 |
| 1,924,002 A | 8/1933 | Rush | |
| 2,394,568 A * | 2/1946 | Stewart | 254/132 |
| 2,749,088 A * | 6/1956 | Jennens | 254/132 |
| 2,791,462 A * | 5/1957 | Solway | 294/104 |
| 3,608,644 A * | 9/1971 | Ambrose | 172/378 |
| 3,957,299 A * | 5/1976 | Johnson et al. | 294/50.9 |
| 4,007,916 A * | 2/1977 | Maples | 254/132 |
| 4,011,612 A * | 3/1977 | Atkinson | 7/116 |
| 4,483,133 A * | 11/1984 | Pasley | 56/400.06 |
| 4,706,582 A * | 11/1987 | Keskilohko | 111/106 |
| 4,856,759 A * | 8/1989 | Ness | 254/132 |
| 4,930,825 A | 6/1990 | Dearman | |
| 5,456,449 A * | 10/1995 | Smith | 254/132 |
| 5,490,374 A | 2/1996 | Calande | |
| 5,743,340 A | 4/1998 | Giacomini | |

FOREIGN PATENT DOCUMENTS

| | | | | |
|---|---|---|---|---|
| DE | 3226210 A | * | 1/1984 | A01B/1/18 |
| GB | 2090711 A | * | 7/1982 | A01B/3/02 |
| GB | 2183432 A | * | 6/1987 | A01B/1/10 |
| GB | 2183433 A | * | 6/1987 | A01C/5/02 |
| GB | 2282740 A | * | 9/1993 | A01B/1/18 |
| GB | 2282740 A | * | 4/1995 | A01B/1/18 |
| WO | WO 200021352 A | * | 10/1999 | A01B/1/18 |

* cited by examiner

*Primary Examiner*—Robert E. Pezzuto
*Assistant Examiner*—Alexandria K. Pechhold

(57) ABSTRACT

A tool, having a handle attached to a gripping structure, for ergonomically pulling weeds, including the bulk of their root systems, or other protruding shafts from the ground. The gripping structure has at least one tong that rotates from pressure against the surface of the ground. The rotation of the tong or tongs causes a gripping surface at the end of a tong to compress towards a mated gripping surface, forming a jaw. When operating the tool, the two gripping surfaces sandwich the weed-stalk to be extracted. This gripping structure works automatically with pressure against the surface, so unnecessary steps are eliminated in engaging or disengaging the tool. The handle is a lever arm pivoting the entire gripping structure, this forces whatever is held in the jaw away from the surface.

4 Claims, 2 Drawing Sheets

WEED-GRIPPING PRY TOOL

CROSS-REFERENCE TO RELATED APPLICATIONS

Figure 1:
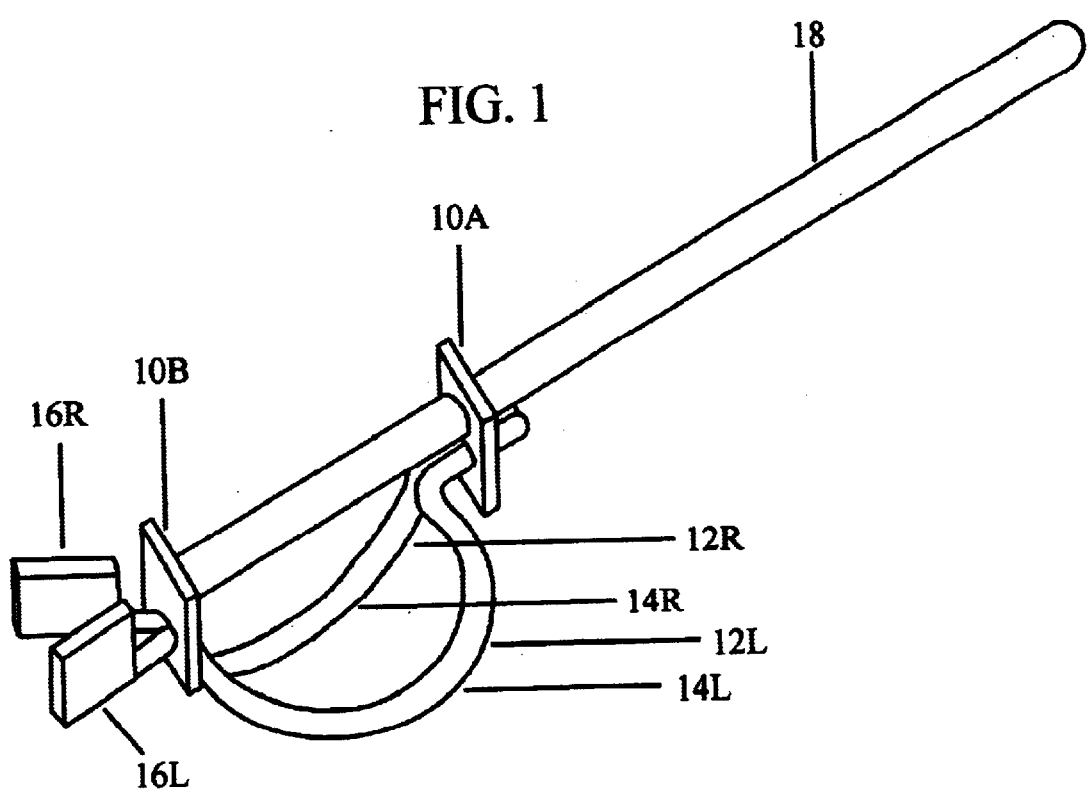

Not applicable.

STATEMENT REGARDING FEDERALLY SPONSORED RESEARCH

Not applicable

REFERENCE TO SEQUENCE LISTING

Not applicable

BACKGROUND

1. Field of Invention

This invention relates to weed removing tools, specifically tools that grip weeds near the ground and utilize some mechanism to extract gripped weeds, including the underlying root system.

2. Problems to Overcome and Inefficiencies of Prior Art

Invasive plant species ruin the biological diversity of wildlands, and diminish the productivity of croplands and rangelands. One attempted remedy to this problem is to cut the weeds off at ground level. Many prior art tools do this; some on a massive scale like dozers and mowers, but cutting weeds down often does not cure the problem. Land cleared by cutting can be reinfested with weeds growing from the thriving root systems left behind. Oftentimes, cutting makes land productivity worse because the same weeds regrow, crowding out any desired plant growth, while also leaving dangerous stumps that can trip humans or damage livestock's hooves.

Herbicides and controlled burns are also utilized in destroying weeds, but these methods have drawbacks. There are many legalities to research before application, and oftentimes a permit is required. The costs can be prohibitive with permits, expensive chemicals, and costly safety equipment. Many invasive plant species are resistant to these methods, multiplying the costs with multiple applications. Environmental concerns rank among the strongest reasons not to use herbicides or land burning. Oftentimes, desired species are indiscriminately killed. Humans, wildlife, and livestock can have ill effects from these methods as well, due to contaminated air and food supplies. Herbicides can also have unknown toxic effects limiting the agricultural productivity of the land.

The best solution is to remove a weed along with its underlying root system, preventing further regrowth. In the past, this meant physically bending over to get the best hold near the ground, grabbing the weed-stalk or clump of weed-stalks by hand, and pulling up. Hand-pulling weeds is prohibitively fatiguing for large stands of dense weed growth, working at awkward angles against well-fortified root systems. Hand-pulling is also undesirable for weeds with thorns, requiring one to wear gloves and other protective clothing in the close proximity of the thorns. Some weeds are just too large to remove by hand and require mechanical assistance.

Consequently, inventors created several types of tools to remove weeds along with a corresponding root system, but nevertheless all prior art weed removal tools suffer from at least one of the following disadvantages:

(a) The tool makes no use of leverage to pull up forcibly against the well-fortified root system. This is just as straining as hand-pulling is on the knees, shoulders and back.

(b) There is no mechanical assistance available to hold or release a weed, requiring one to forcibly hold a mechanism closed to continue holding a weed. This tires arms, wrists and hands unnecessarily.

(c) Using the tool is not ergonomical, requiring one to bend at the waist or squat down, close to the weed to apply a grip, or one needs to repeatedly apply pressure to a lever, switch, or manual setting. If the tool relies extensively on human muscle power, it is impractical in long-term use for reasons of fatigue and musculoskeletal disorders from repetitive motion.

(d) Human effort or extra steps are required to dislodge a weed from the tool itself, before the tool can be used on another weed.

(e) The tool can only be used on a weed of a certain size or of a particular form. This tool is ineffective on the uncooperative tangles of weeds found in the field. Weeds only rarely grow identical in form and evenly spaced from one another.

(f) Many of these tools must be fabricated in only one size to accommodate for human use, as they do not work correctly in alternate sizes.

(g) The tool requires one to stand unreasonably close to a weed, because it only works vertically, increasing the chance of toppling a thorned weed onto one's self.

(h) The tool removes a significant amount of soil with the extracted weed, leaving one the extra task of filling holes in. These holes can be dangerous to any person or animal stepping in one, as well as unsightly.

SUMMARY

In accordance with the present invention, a weed-gripping pry tool comprises a gripping jaw that closes when a fulcrum protrusion is pressed against a surface, and a handle used to pry the entire gripping structure, including the weed held, away from the surface.

OBJECTS AND ADVANTAGES

Accordingly, several objects and advantages of my invention are:

(a) to provide leverage to help the one extracting weeds and the corresponding root system, saving the user's muscles and joints from fatigue and injury, (b) to grip the weed or weeds mechanically and automatically, so one need only exert pressure downwards on a handle to grip the weed or weeds, as well as pry up the weed or weeds, (c) to allow application of the tool from an upright, ergonomical position, with no excessive bodily force required so one can use the tool comfortably for long periods of time, (d) to release the weed as necessary, so the one using the tool need not waste time or force, allowing the tool to quickly release and secure a new grip quickly, (e) to easily adapt to weeds of differing size and form and penetrate thick masses of weeds, because of a V-shaped gripping jaw that can grip weeds anywhere inside the jaw, thereby grabbing large weed stalks in the wide part of the gripping jaw, and small weeds deep within the jaw where it is narrow, (f) to allow any size tool be made, from a one handed model up to any size, even mounted on the back of a machine to pull out large trees or stumps, (g) to provide one a reasonable distance from a weed for the tool to work, so one need not be nudged by thorns or sharp branches, afforded because the handle runs in line with the axis about which each tong rotates, (h) to remove little or no soil along with the extracted weed, freeing one from filling in unnecessary holes.

Further objects and advantages are to easily compress a forceful grip at the base of a weed or weed clumps, and easily, conveniently, and ergonomically force a weed up. This tool is simple in construction and operation as well as inexpensive to manufacture and requires virtually no maintenance.

DRAWING FIGURES

Figure 2:
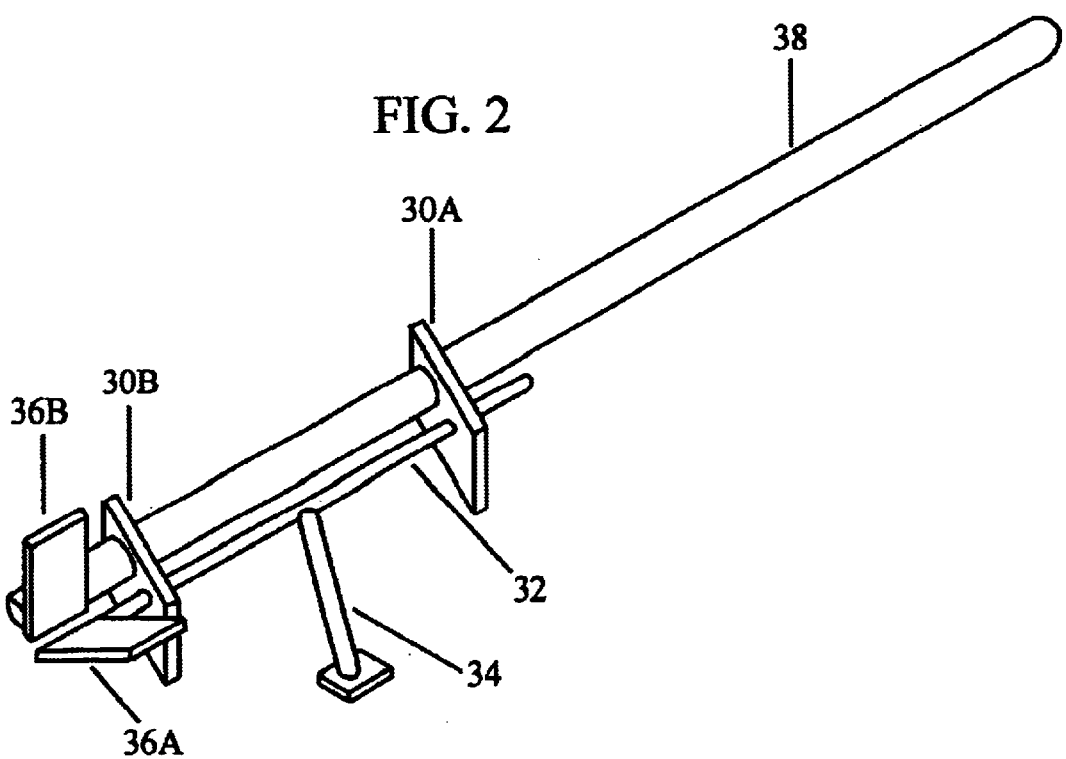

FIG. 1 is a perspective view of a preferred embodiment of a weed-gripping pry tool FIG. 2 is a perspective view of an alternate embodiment of a weed-gripping pry tool

REFERENCE NUMERALS IN DRAWINGS

| | |
|---|---|
| 10A | binding |
| 10B | binding |
| 12L | left tong |
| 12R | right tong |
| 14L | arch of left tong |
| 14R | arch of right tong |
| 16L | left gripping surface |
| 16R | right gripping surface |
| 18 | handle |
| 30A | binding |
| 30B | binding |
| 32 | tong |
| 34 | fulcrum protrusion |
| 36A | left gripping surface |
| 36B | right gripping surface |
| 38 | handle |

DETAILED DESCRIPTION

FIG. 1—Preferred Embodiment

FIG. 1 is a perspective view of the preferred embodiment of a weed-gripping pry tool. An elongate handle 18 is of such length and made of such strength that one can comfortably use handle 18 as a lever arm. A binding 10A is fixed to handle 18. A binding 10B is fixed to the terminating end of handle 18. A tong 12L and a tong 12R are bound to handle 18 by bindings 10A and 10B, each tong 12L and 12R running through both bindings 10A and 10B. Binding 10A firmly fixes tong 12L and 12R to handle 18, but binding 10B is only attached firmly to handle 18, leaving tongs 12L and 12R free to rotate on an axis approximately parallel to handle 18, but not free to move sideways or up and down in relation to handle 18.

Tongs 12L and 12R are approximately symmetrical about handle 18, made from a material with the property to spring back to original shape when a deforming force is no longer acting on the material. Tongs 12L and 12R are straight for a distance at the point in which they touch and are fixed by binding 10A to handle 18. After the straight portion of tong 12L, an arch 14L is added to tong 12L. Arch 14L is angled downwards and away from tong 12R. After the straight portion of tong 12R, an arch 14R is added to tong 12R. Arches 14L and 14R are symmetrical, and are angled downwards away from each other at the same angle from the handle. At binding 10B, tong 12L angles sideways in a short segment to the left and away from tong 12R, then terminates. A gripping surface 16L is added to the short segment of tong 12L that runs from binding 10B to the terminating end of tong 12L. At binding 10B, tong 12R angles sideways in a short segment to the right and away from tong 12L, then terminates. A gripping surface 16R is added to the short segment of tong 12R that runs from binding 10B to the terminating end of tong 12R. Gripping surfaces 16L and 16R form a symmetrical jaw.

Operation—FIG. 1—Preferred Embodiment

While in an upright comfortable position, one holds handle 18 and sandwiches a weed-stalk or weed clump between gripping surfaces 16L and 16R. The weed-stalk or weed clump, in resisting compression, causes the elastic properties of tongs 12L and 12R to press back forming a grip. One then allows arches 14L and 14R to rest on the ground. As the physically lowest point to the ground, arches 14L and 14R are the first point of contact with the ground. The pressure of the ground against arches 14L and 14R forces the entire tongs 12L and 12R to rotate, except where they are physically fixed to binding 10A. Tongs 12L and 12R rotate inside binding 10B, forcing gripping surfaces 16L and 16R to compress towards each other, thereby grabbing the weed-stalk or weed clump.

Arches 14L and 14R become the fulcrum point of a lever, the mechanically advantaged end of the lever being handle 18 pulled downwards, the other end of the lever being the gripped weed-stalk or weed clump. As one pulls down on handle 18, working with gravity to prevent fatigue, the other end of the lever is rolled up smoothly on fulcrum arches 14L and 14R uprooting the weed or weed clumps while simultaneously producing greater gripping compression. Once gripping surfaces 16L and 16R reach desired height from the ground, one can quit pressing downwards with gravity, and tongs 12L and 12R will spring rotationally back to their natural position, forcing gripping surfaces 14L and 14R apart, thereby releasing the weed. Tongs 12L and 12R spring back rotationally because they are made of a material that springs back to a natural position, and they are bound by binding 10A in that natural position. Once tongs 12L and 12R rotate back to their natural position, one has the option of lowering arches 14L and 14R back against the ground getting a lower grip on the newly exposed roots or to quickly grab a new weed-stalk or weed clump.

FIG. 2—Alternate Embodiment

FIG. 2 is a perspective view of an alternate embodiment of a weed-gripping pry tool. A gripping surface 36B is added to one end of an elongate handle 38. A tong 32 is bound to handle 38A in parallel fashion by a binding 30A, and by a binding 30B near the end of handle 38 almost to gripping surface 36B. Bindings 30A and 30B are fixed to handle 38, but only surround tong 32, allowing tong 32 to rotate on an axis approximately parallel to handle 38, but not any sideways or up an down motion in relation to handle 38. A gripping surface 36A is added to tong 32 on the short segment that extends past binding 30B. Gripping surfaces 36A and 36B are added in such a way that they form a gripping jaw. A fulcrum protrusion 34 is extended downwards at an angle from tong 32 in a fashion approximately parallel to the axis about which tong 32 rotates.

Operation—FIG. 2—Alternate Embodiment

One sandwiches a weed-stalk or weed clump between gripping surfaces 36A and 36B. Touching fulcrum protrusion 34 to the ground causes tong 32 to rotate, compressing gripping surface 36A towards gripping surface 36B. The jaw squeezes the weed-stalk or weed clump. When the jaw is fully compressed, tong 32 can't rotate further in either direction, as fulcrum protrusion 34 against the ground holds one direction, gripping surface 36A against gripping surface 36B prevents the other direction. Fulcrum protrusion 34 is still angled downwards and becomes a fulcrum about which handle 38 pries the compressed gripping jaw away from the ground, pulling up the weed or weed clump, as downward pressure is applied on handle 38.

Conclusion, Ramification, and Scope

Accordingly, the reader will see that the gripping mechanism of this invention efficiently grips a weed, and then one can comfortably pull downwards working with gravity on the handle to extract the same weed from a surface. Although the description contains many specificities, these should not be construed as limiting the scope of the invention but as merely providing illustrations to the preferred embodiments of this invention. For example, this invention is scalable. Any size, from tiny on up to tractor mounted, could be made and the principles would still remain intact. Another example is a cutting variant with scissors rather then gripping surfaces. Altering a fulcrum protrusion attached to a tong for greater contact area with the ground can allow more efficient use on very soft ground; altering a fulcrum protrusion attached to a tong for shape can allow the tool to get to areas where it is difficult to grip a weed due to contours in the land, or existing plant structures like vines or exposed roots. The handle can be angularly adjustable to allow one to be in close proximity to the weed or weeds to be extracted, or to allow use of the tool without one assuming an awkward position. The handle may terminate earlier, ending at the very beginning of the tongs rather then run up to the binding at the gripping surfaces.

The gripping surfaces can be shaped physically into the tongs, or a separate piece fastened on, to allow changing of gripping surfaces for adaptability to any relevant situation or in case of wear. The segments past the binding that the gripping surfaces are added to can be angled downwards, with the tongs crossing to allow the gripping surfaces to be pressed under the soil to grab an underground segment of a weed.

Alternately, a tong or tongs can be made of materials that are rigid and firm rather then spring back to an at rest position. The tong or tongs are bound to the handle, but allowed rotational movement. Gravity pulls the lever arm added to the each tong downwards, thereby opening the gripping jaw mechanically with the rotational movement of the tong or tongs. Springs or cord can be strewn between tongs and handle if a specific jaw position is desired, to allow working at odd angles. As another example, this invention need not be limited to pulling plants, but any shaft such as fence posts and shaft-like fasteners like bolts or screws.

Thus the scope of the invention should be determined by the appended claims and their legal equivalents, rather than by the examples given.

I claim:

1. An improved weed extracting apparatus comprising:
   a. a handle
   b. a first tong
   c. a first gripping surface added to said first tong
   d. a second gripping surface
   e. a means of attaching said first tong to said handle such that said means of attaching allows said first tong to rotate in relation to said handle about an axis of rotation which runs approximately parallel to said handle, and said means of attaching allows said first gripping surface to compress towards said second gripping surface, forming a gripping jaw, when said first tong is made to rotate,
   f. a first fulcrum protrusion, whose form can be quite varied, so long as said first fulcrum protrusion extends downward away from the axis about which said first tong rotates, and said first fulcrum protrusion is a contact point with the ground allowing said handle to be the advantaged end of a lever arm pivoting atop of said first fulcrum protrusion to pry upwards on the other end of the lever, the gripping jaw, and said first fulcrum protrusion causes said first tong to rotate when said first fulcrum protrusion is made to contact the ground,
      wherein said weed extracting apparatus only requires one moving piece to function, which consists of the combination of said first gripping surface, said first tong, and said first fulcrum protrusion, afforded because the axis of rotation about which said tong rotates runs approximately parallel to said handle.

2. The weed extracting apparatus of claim 1 further adding
   a. a second tong, using a nearly identical means of attaching to said handle as said first tong in such fashion that said first and second tongs are approximately symmetrical about said handle, said means of attaching said first and second tongs allows both said first and second tongs to rotate, with said second gripping surface added to said second tong in the same fashion as said first gripping surface is added to said first tong, symmetrically about said handle,
   b. a second fulcrum protrusion, extended from said second tong, approximately symmetrical about said handle to said first fulcrum protrusion
      whereby both said first and second tongs will rotate if said first and second fulcrum protrusions are pressed against the ground, causing said first and second gripping surfaces to rotate towards each other, such that any hand operated gripping mechanism is unnecessary, as said weed extracting apparatus automatically grips with ground contact, and both said first and second fulcrum protrusions are the two stabilized points of contact with the ground which allow the operator to pivot said handle downwards.

3. The weed extracting apparatus of claim 2 wherein
   a. said first fulcrum protrusion is substantially in the form of an arch, and said first fulcrum protrusion is hereinafter referred to as a first arch, said first arch extends from near one end of said first tong and terminates near the other end of same said first tong,
   b. said second fulcrum protrusion is substantially in the form of an arch, and said second fulcrum protrusion is hereinafter referred to as a second arch, said second arch extends from near one end of said second tong and terminates near the other end of same said second tong,
      wherein said weed extracting apparatus pivots on a fulcrum point that rolls along said first and second arches as said handle's position is raised or lowered for smooth weed extraction.

4. The weed extracting apparatus of claim 3 further adding
   a. a means to springably return said first and second tongs to a natural position in which the gripping jaw is open,
      wherein said weed extracting apparatus just as quickly disengages as captures a weed or weed clump because said means to springably return said first and second tongs to a natural position springably rotates said first and second tongs, thereby rotating said first and second gripping surfaces away from each other.

* * * * *